US006527972B1

United States Patent
Fuchs et al.

(10) Patent No.: US 6,527,972 B1
(45) Date of Patent: Mar. 4, 2003

(54) MAGNETORHEOLOGICAL POLYMER GELS

(75) Inventors: Alan Fuchs, Reno, NV (US); Faramarz Gordaninejad, Reno, NV (US); Daniel Blattman, Reno, NV (US); Gustav H. Hamann, Reno, NV (US)

(73) Assignee: The Board of Regents of the University and Community College System of Nevada, Reno, NV (US)

(*) Notice: Subject to any disclaimer, the term of this patent is extended or adjusted under 35 U.S.C. 154(b) by 0 days.

(21) Appl. No.: 09/790,992

(22) Filed: Feb. 20, 2001

Related U.S. Application Data

(60) Provisional application No. 60/183,515, filed on Feb. 18, 2000.

(51) Int. Cl.[7] .............................. H01R 1/44; H01R 1/00
(52) U.S. Cl. .................. 252/62.54; 252/62.53; 252/62.52
(58) Field of Search ................ 252/62.52, 62.54, 252/62.53

(56) References Cited

U.S. PATENT DOCUMENTS

| | | | |
|---|---|---|---|
| 5,298,179 A | 3/1994 | Ukita et al. | 252/62.54 |
| 5,382,373 A | 1/1995 | Carlson et al. | 252/62.55 |
| 5,505,880 A * | 4/1996 | Kormann et al. | 252/62.52 |
| 5,508,880 A | 4/1996 | Beyer | 361/230 |
| 5,525,249 A | 6/1996 | Kordonsky et al. | 252/62.56 |
| 5,549,837 A | 8/1996 | Ginder et al. | 252/62.52 |
| 5,578,238 A | 11/1996 | Weiss et al. | 252/62.52 |
| 5,599,474 A | 2/1997 | Weiss et al. | 252/62.52 |
| 5,645,752 A * | 7/1997 | Weiss et al. | 252/500 |
| 5,667,715 A | 9/1997 | Foister | 252/62.52 |
| 5,670,077 A * | 9/1997 | Carlson et al. | 252/62.52 |
| 5,683,615 A | 11/1997 | Munoz et al. | 252/62.52 |
| 5,705,085 A | 1/1998 | Munoz et al. | 252/62.52 |
| 5,804,095 A | 9/1998 | Jacobs et al. | 252/62.52 |
| 5,985,168 A * | 11/1999 | Phule | 252/62.51 C |
| 5,989,447 A * | 11/1999 | Podszun et al. | 252/62.52 |
| 6,019,201 A | 2/2000 | Gordaninejad et al. | 188/267.1 |

FOREIGN PATENT DOCUMENTS

| | | | |
|---|---|---|---|
| JP | 61-243858 | * | 10/1986 |
| JP | 05025316 | | 2/1993 |
| JP | 10296074 | | 11/1998 |
| WO | WO94/10693 | | 5/1994 |
| WO | WO 97/2580 | * | 1/1997 |
| WO | WO97/02580 | | 1/1997 |

OTHER PUBLICATIONS

Translation of JP 05–25316.*
Translation of 10–296074.*

(List continued on next page.)

Primary Examiner—C. Melissa Koslow
(74) Attorney, Agent, or Firm—Greenlee, Winner and Sullivan, P.C.

(57) ABSTRACT

Magnetorheological materials are provided comprising magnetic particles, a polymeric gel and a carrier material. The polymerization of the gel is preferentially accomplished in the presence of the magnetic particles and the carrier material. Magnetorheological materials are provided having a selected off-state viscosity and a selected on-state apparent viscosity. The method of preparing these magnetorheological materials is also provided. The carrier material, the polymeric gel and the magnetic particles are selected so that the resulting magnetorheological material has the desired off-state viscosity and on-state apparent viscosity. These materials have good dispersion characteristics, reduced settling, superior off-state viscosity and superior apparent viscosity in the presence of a magnetic field.

36 Claims, 5 Drawing Sheets

OTHER PUBLICATIONS

Ashour, O. et al. (Mar. 1996), "Magnetorheological Fluids: Materials Characterization and Devices," *J. Int. Mat. Sys. Struct.* 7:123–130.

Dang, A. et al. (2000), "Yield Stress Measurements of Magnetorheological Fluids in Tubes," *Ind. Eng. Chem. Res.* 39:2269–2274 no month.

Gao, W. et al. (1996), "Self–assembled Monolayers of Alkylphosphonic Acids on Metal Oxides," *Langmuir* 12:6429–6435 no month.

Ginder, J.M. and Davis, L.C., (Dec. 1994), "Shear Stresses in Magnetorheological Fluids: Role of Magnetic Saturation," *Appl. Phys. Lett.* 65(26):3410–3412.

Ginder, J.M. et al. (1996), "Rheology of Magnetorheological Fluids: Models and Measurements," *Intern. J. Mod. Phys. B.*, 10(23,24):3293–3303 no month.

Ginder, J.M., (1996), "Rheology Controlled By Magnetic Fields," *Encyclopedia of Applied Physics,* 16:487–503 no month.

Ginder, J.M., (Aug. 1998), "Behavior of Magnetorheological Fluids," *MRS Bulletin,* 26–29.

Ginder et al., (1999) Magnetorheological Elastomers: Properties and Applications, *SPIE* vol. 3675:131–138 no month.

Huang,J.Y., and Lai, Pik–Yin (2000), "Formation and Polarization of Dipolar Chains," *Physica A* 281:105–111 no month.

Jolly, M.R. et al., (Mar. 1998), "Properties and Applications of Commercial Magnetorheological Fluids," *SPIE $5^{th}$Int. Symposium on Smart Structures and Materials* San Diego, CA.

Kataby. G. et al., (1997), "Self–assembled Monolayer Coatings on Amorphous Iron and Iron Oxide Nanoparticles: Thermal Stability and Chemical Reactivity Studies," *Langmuir* 13:6151–6158 no month.

Kataby, G. et al., (1998), "The Absorption of Monolayer Coatings on Iron Nanoparticles: Mössbauer Spectroscopy and Xanes Results," *Thin Solid Films* 333:41–49 no month.

Kataby, G. et al., (1999), "Coating Carboxylic Acids on Amorphous Iron Nanoparticles," *Langmuir* 15:1703–1708 no month.

Laun, H.M. et al., (1996), "Rheometry on Magnetorheological (MR) Fluids," *Reol. Acta.* 35:417–432 no month.

Liu, Y. et al., (1997), "Layer–by–layer Electrostatic Self–assembly of Nanoscale $Fe_3O_4$ Particles and Polyimide Precursor on Silicon and Silica Surfaces," *Appl. Phys. Lett.* 71(16):2265–2267 no month.

Nilsson, S. et al., (2000), "Novel Organized Structures in Mixtures of a Hydrophobically Modified Polymer and Two Oppositely Charges Surfactants," *Langmuir* 16:6825–6832 no month.

Nozawa, K. et al., (1997), "Chemical Modification of Alkanethiol Monolayers for Protecting Iron Against Corrosion," *Corrosion Science* 39(9):1625–1639 no month.

Odenbach, S. et al. (1999), "A Rheometer Dedicated for the Investigation of Viscoelastic Effects in Commercial Magnetic Fields," *J. Magnetism and Magn. Mat.* 201:155–158 no month.

Phule, P.P. (Aug. 1998), "Synthesis of Novel Magnetorheological Fluids," *MRS Bulletin,* 23–25.

Phule, P.P. and Ginder, J.M., (Aug. 1998), "The Materials Science of Field–Responsive Fluids," *MRS Bulletin,* 19–21.

Prozorov, T. et al., (1998), "Effect of Surfactant Concentration on the Size of Coated Ferromagnetic Nanoparticles," *Thin solid Films* 340:189–193 no month.

Raj, K. et al., (1995), "Advances in Ferrofluid Technology," *J. Magnetism and Magn. Mat.* 149:174–180 no month.

Ramachandran, S. et al., (1996), "Self–assembled Monolayer Mechanism for Corrosion Inhibition of Iron by Imidazolines," *Langmuir* 12:6419–6428 no month.

Schlotter, N.E. et al., (1986), "Formation and Structure of a Spontaneously Adsorbed Monolayer of Arachidic on Silver," *Chem. Phys. Lett.* 132(1):93–98 no month.

Shiga, T. et al., (1993), "Electroviscoelastic Effect of Polymer Blends Consisting of Silicone Elastomer and Semiconducting Polymer Particles," *Macromolecules,* 26:6958–6963 no month.

Shiho, T. et al., (2000), "Magnetic Compounds as Coating on Polymer Particles and Magnetic Properties of the Composite Particles," *J. Royal Soc. Chem.* 10:333–336 no month.

Wolpers, M. et al., (1991), "Surface Analytical Investigations of Metal Surfaces Modified by Langmuir–blodgett Films of Silanes," *App. Surf. Sci.* 47:49–62 no month.

Wolpers, M. et al. (1990), "SEM and Sam Imaging of Silane Lb Films on Metallic Substrates," *App. Surf. Sci.* 45:167–170 no month.

Yu, H–Z et al., (2000), "Molecular Orientation and Electrochemical Stability of Azobenzene Self–assembled Monolayers on Gold: an In–situ FTIR Study," *Langmuir* 16:6948–6954 no month.

\* cited by examiner

MAGNETORHEOLOGICAL POLYMER GELS

CROSS-REFERENCE TO RELATED APPLICATIONS

This application claims priority from U.S. Provisional Application No. 60/183,515, filed Feb. 18, 2000, which is incorporated herein by reference to the extent not inconsistent herewith.

BACKGROUND OF THE INVENTION

Magnetorheological fluids (MRFs) are commercially available magnetic fluids which are currently used for a variety of applications. These include use in automotive parts: engine mounts, shock absorbers, and seat dampers [Phule, Pradeep P., and John M. Ginder, eds., "The Materials Science of Field-Responsive Fluids" *MRS Bulletin,* 19–21, August 1998; Ginder, John M., "Behavior of Magnetorheological Fluids" *MRS Bulletin,* 26–29, August 1998; Ginder, E. M. and Davis, C. S., "Shear Stresses in Magnetorheological Fluids: Role of Magnetic Saturation," *Appl. Phys. Lett.* 65 3410–3412, Dec. 26, 1994; Ashour, Osama, and Craig A. Rogers, "Magnetorheological Fluids: Materials Characterization and Devices." *J Int. Mat. Sys. Struct.* 7: 123–130, March 1996]. Other applications cover a range from exercise equipment to aspherical optical lens polishing. In the area of vibration control and damping, earthquake resistant structures are built that utilize these fluids using semi-active control [Phule, Pradeep P., and Ginder, John M., eds., "The Materials Science of Field-Responsive Fluids" *MRS Bulletin,* 19–21, August 1998; Ginder, John M. "Behavior of Magnetorheological Fluids" *MRS Bulletin,* 26–29, August 1998; Ashour, Osama, and Craig A. Rogers. "Magnetorheological Fluids: Materials Characterization and Devices." *J. Int. Mat. Sys. Struct.* 7 123–130, March 1996; Tang, X., X. J. Wang, W. H. Li, and P. Q. Zhang. "Testing and Modeling of an MR Damper in the Squeeze Flow Mode"].

MRFs excel in these applications because their rheological properties are controlled over several orders of magnitude. Without an applied magnetic field, the typical MRF acts like a Newtonian fluid [Ginder, John M., "Behavior of Magnetorheological Fluids" *MRS Bulletin,* 26–29, August 1998; Dang, Anh, Liling Ooi, Janine Fales, and Pieter Stroeve, "Stress Measurements of Magnetorheological Fluids in Tubes." *Ind. Eng. Chem. Res.* 39:2269–2274, 2000]. When a field is applied, a dipole moment is induced in the particles in the MRF. This causes the particles to align "head-to-tail" and form chains of particles. Thus, these particles form structures parallel to the magnetic field [Ginder, John M., "Behavior of Magnetorheological Fluids" *MRS Bulletin,* 26–29, August 1998]. The MRF becomes a weak viscoelastic solid when the chain or column structures form. As a result, the rheological properties of the materials change. As the magnetic field increases, the material exhibits a rapid and nearly reversible increase in yield stress. Because of the change in material properties under the influence of a magnetic field, the MRF properties are controlled and therefore provide a new means of controlling electromechanical devices. [Phule, Pradeep P., and John M. Ginder, eds. "The Materials Science of Field-Responsive Fluids" *MRS Bulletin,* 19–21, August 1998; Jolly, Mark R., Jonathan W. Bender, and J. David Carlson "Properties and Applications of Commercial Magnetorheological Fluids" *SPIE 5$^{th}$ Int. Symposium on Smart Structures and Materials* San Diego, Calif., Mar. 15, 1998.]

While MRFs may be similar to ferrofluids, they also have important differences. They are composed of three components like ferrofluids; thus, they have a carrier fluid, magnetic particles, and additives [Raj, K. B. Moskowitz, and R. Casciari "Advances in Ferrofluid Technology" *J. Magn. Magn. Mat.* 149 174–180, 1995]. However, the particles used in ferrofluids are superparamagnetic iron oxide nanoparticles (~5–10 nm). [Phule, Pradeep P., and John M. Ginder, eds., "The Materials Science of Field-Responsive Fluids" *MRS Bulletin,* 19–21, August 1998; Raj, K. B. Moskowitz, and R. Casciari "Advances in Ferrofluid Technology" *J. Magn. Magn. Mat.* 149 174–180, 1995]. As a result, they do not exhibit a shear yield stress like MRFs while under an applied magnetic field. [Phule, Pradeep P., and John M. Ginder, eds. "The Materials Science of Field-Responsive Fluids" *MRS Bulletin,* 19–21, August 1998; Ashour, Osama, and Craig A. Rogers, "Magnetorheological Fluids: Materials Characterization and Devices." *J. Int. Mat. Sys. Struct.* 7 123–130, March 1996.] This is due to a reduced tendency to form chains under a magnetic field. Thus, while viscosity changes can be observed, they are small. [Ashour, Osama, and Craig A. Rogers, "Magnetorheological Fluids: Materials Characterization and Devices." *J. Int. Mat. Sys. Struct.* 7 123–130, March 1996; Odenbach, Stefan, Thomas Rylewicz, and Michael Heyen. "A Rheometer Dedicated for the Investigation of Viscoelastic Effects in Commercial Magnetic Fields." *J. Magn. Magn. Mat.* 201 155–158 1999.] The applications, as a result, are much different. In addition to being used in seals, the ferrofluids have applications in stepper motors and sensors. [Raj, K. B. Moskowitz, and R. Casciari "Advances in Ferrofluid Technology" *J. Magn. Magn. Mat.* 149 174–180, 1995.]

For an MRF, magnetic particles, such as iron, can be suspended in a fluid. Under a magnetic field, these particles form chains [Phule, Pradeep P., and John M. Ginder, eds., "The Materials Science of Field-Responsive Fluids" *MRS Bulletin,* 19–21, August 1998; Phule, Pradeep P., "Synthesis of Novel Magnetorheological Fluids" *MRS Bulletin,* 23–25, August 1998; Huang, Jiun-Yan and Pik-Yin Lai, "Formation and Polarization of Dipolar Chains" *Physica A* 281 105–111, 2000] that significantly increase the yield stress of the material. The carrier fluid acts as the medium for other components. Suspended in the medium are the magnetic particles that form chains when a magnetic field is applied. Finally, additives are used to provide stability to the mixture, corrosion control, lubrication, anti-oxidants, pH shifters, dyes and pigments, salts, and deacidifiers. [Phule, Pradeep P. and John M. Ginder, eds. "The Materials Science of Field-Responsive Fluids" *MRS Bulletin,* 19–21, August 1998; Dang, Anh, Liling Ooi, Janine Fales, and Pieter Stroeve. "Stress Measurements of Magnetorheological Fluids in Tubes." *Ind. Eng. Chem. Res.* 39 2269–2274, 2000; Phule, Pradeep P. "Synthesis of Novel Magnetorheological Fluids" *MRS Bulletin,* 23–25, August 1998; A. Fuchs, F. Gordaninejad, C D. Blattman, and G. Hamann. "Magnetorheological Polymeric Gel Materials." Provisional U.S. Patent, February 2000.]

Typically, the carrier medium is a silicone oil or hydrocarbon fluid. [Phule, Pradeep P., and John M. Ginder, eds. "The Materials Science of Field-Responsive Fluids" *MRS Bulletin,* 19–21, August 1998; Dang, Anh, Liling Ooi, Janine Fales, and Pieter Stroeve. "Stress Measurements of Magnetorheological Fluids in Tubes." *Ind. Eng. Chem. Res.* 39 2269–2274, 2000.] This is because it exhibits many of the properties that are desirable in MRF. Ideally, the fluid should be thermally stable, have a high boiling point, be nonreactive (especially with the dispersed material) and be nontoxic. Also, the fluid should contribute to the stability of the mixture, but at the same time enable the redispersibility of the magnetic particles. The temperature dependence of the medium's viscosity is also very important, and is in fact the dominating factor in the operating range of the MRF. For the stability of the MRF, the carrier fluid should be noncorrosive and nonreactive with the magnetic particles and other ingredients. Finally, the fluid should not cause sealing problems in the device in which it will be used. [Ginder, John M., "Behavior of Magnetorheological Fluids" *MRS Bulletin,* 26–29, August 1998; Phule, Pradeep P. "Synthesis of Novel Magnetorheological Fluids" *MRS Bulletin,* 23–25, August 1998.]

The dispersed phase of an MRF usually is a soft magnetic material like iron particles of 1–10 um size [Phule, Pradeep P. and John M. Ginder, eds., "The Materials Science of Field-Responsive Fluids" *MRS Bulletin,* 19–21; August 1998.] Several important factors must be considered in the choice of the dispersed phase. First, the volume fraction of the magnetic materials in the fluid is chosen. For the iron system, usually 0.3 to 0.5 volume fraction of carbonyl iron is used in the fluid. This leads to a reasonable yield stress but does not have the higher off-state viscosity of higher volume fractions. Several problems occur when the particles are too small. They are more influenced by the carrier fluid than the larger particles. They are also more sensitive to temperature. Also, the possibility of agglomeration increases. Nano-MR fluids are described in the literature [Phule, Pradeep P. "Synthesis of Novel Magnetorheological Fluids" *MRS Bulletin,* 23–25, August 1998; Luan, H. Martin, Claudius Kormann, and Norbert Willenbacher, "Rheology on Magnetorheological (MR) Fluids." *Reol. Acta.,* 35 417–432, 1996]. BASF researchers created stable (by using polyelectrolyte adsorption) nano-MR fluids using ferrites (<100 nm). However, the yield stress is only ~6 kPa and it is temperature sensitive [Phule, Pradeep P. "Synthesis of Novel Magnetorheological Fluids" *MRS Bulletin,* 23–25, August 1998].

The manufacture of iron and iron-based alloys is achieved using several methods: decomposition of iron pentacarbonyl, sol-gel ultrasonic decomposition of organometallic precursors, plasma torch synthesis, electroexplosion of metal wires, chemical reduction and precipitation, and laser ablation. Preferably, soft magnetic materials like iron are used for their high saturation magnetization. Fe-Co alloys have the highest saturation magnetization (~2.4 T), but cost and unavailability make them undesirable unless the higher material strength is needed. Ferromagnetic materials such as manganese-zinc ferrite and nickel-zinc ferrite (~2 $\mu$m in size) have a lower saturation magnetization and thus they have a lower maximum yield stress [Phule, Pradeep P. "Synthesis of Novel Magnetorheological Fluids" *MRS Bulletin,* 23–25, August 1998].

A wide variety of MR materials have been developed [Ginder, J. M., (1996), "Rheology Controlled By Magnetic Fields," *Encyclopedia of Applied Physics,* Vol. 16, pp. 487–503; Ginder, J. M., Sproston, J. L., (1996), "The Performance of Field-Controllable Fluids and Devices," *Proceedings of Actuator 96, 5th International Conference on New Actuators,* pp. 26–28; Ginder, J. M., Davis, L. C., Elie, L. D., (1996), "Rheology of Magnetorheological Fluids: Models and Measurements," *International Journal of Modern Physics* B, Vol. 10, Nos. 23&24, pp. 3293–3303; Ginder, J. M., Davis, L. C., (1994), "Shear Stresses in Magnetorheological Fluids: Role of Magnetic Saturation," *Appl. Phys. Lett.,* Vol. 65, No. 26, pp. 3410–3412; Shiga, T., Okada, A., Kurauchi, T., (1993), "Electroviscoelastic Effect of Polymer Blends Consisting of Silicone Elastomer and Semiconducting Polymer Particles," *Macromolecules,* Vol. 26, p. 6958–6963]. These include materials with differing particulate material, particle size, host material, volume fraction, and additives. These materials include ferrofluids, MR fluids, magnetic powders, and MR elastomers [Ginder, J. M., Nichols, M. E., Elie, L. D., Tardiff, J. L., (1999), "Magnetorheological Elastomers: Properties and Applications, Smart Materials Technologies," Ed. by M. Wuttig, Proc. of SPIE Vol. 3675, in press; Kelso, S. P. and Gordaninej ad, F., (1999), "Magneto-Rheological Fluid Shock Absorbers for Off-Highway, High-Payload Vehicles," *Proceedings of the 1999 SPIE Conference on Smart Materials and Structures,* Long Beach, Calif.].

Several approaches for development of MRFs are documented in the patent literature. U.S. Pat. No. 5,985,168 describes the use of a bridging polymer to modify the surface of the iron particles. This approach leads to improved stability and redispersibility. In this patent only three thermoset polymers are described: polyvinylpyrollidone, polyethyleneamine and poly(4-vinlypyridine). The polymeric material does not appear to be crosslinked.

Organic polymers are also used to coat the surface of iron particles, as described in U.S. Pat. No. 5,989,447. This patent describes many families of polymers which are used and exhibit reduced abrasiveness and produce high stability with regard to settling. The use of polyelectrolytes to coat magnetic particles is described in U.S. Pat. No. 5,508,880. Iron coated with monolayers, bilayers and multiple layers are taught in: K. Nozawa et al., "Chemical Modification of Alanethiol Monolayers for Protecting Iron against Corrosion," (1997); G. Kataby et al., "Self-assembled monolayer coatings of iron nanoparticles with thiol derivatives," (1996); M. Wolpers et al., Surface analytical investigations of metal surfaces modified by langmuir-Blodgett films of silanes," (1990); M. Wolpers et al., "SEM and SAM imaging of silane LB films on metallic substrates," (1990); G. Kataby et al., "The adsorption of monolayer coatings on iron nanoparticles: Mossbauer spectroscopy and XANES results," (1998); S. Ramachandran et al., "Self-assembled monolayer mechanism for corrosion inhibition of iron by imidazolines," (1996); G. Kataby et al., "Coating carboxylic acids on amorphous iron nanoparticles," (1998); G. Kataby et al., "Coating of amorphous iron nanoparticles by long-chain alcohols," (1997); T. Prozorov et al., "Effect of surfactant concentration on the size of coated ferromagnetic nanoparticles," (1998); W. Gao et al., "Self-assembled monolayers of alkylphosphonic acids on metal oxides," in C. Grozinger and L. Reven (1996); Y. Liu et al., "Layer-by-layer electrostatic self-assembly of nanoscale $Fe_3O_4$ particles and polyimide precursor on silicon and silica surfaces," (1997); S. Nilsson et al., "Novel organized structures in mixtures of a hydrophobically modified polymer and two oppositely charged surfactants," (2000); H. Yu et al., "Molecular orientation and electrochemical stability of azobenzene self-assembled monolayers on gold: an in situ FTIR study," (2000); N. E. Schlotter et al., "Formation and structure of a spontaneously adsorbed monolayer of arachidic on silver," (1986); and H. Shiho et al., "Magnetic compounds as coatings on polymer particles and magnetic properties of the composite particles," (1999).

The use of polymeric thixotropes is described in U.S. Pat. Nos. 5,645,752; 5,683,615; 5,382,373; 5,705,085; and WO 94/10693, which disclose the use of polymeric materials as thixotropes with which magnetic particles are mixed to form magnetorheological materials. These publications do not appear to disclose the use of a continuous covalently crosslinked polymeric gel (as opposed to hydrogen-bonded gels) or non-stoichiometric ratios of polymer components to effect partial crosslinking as a means for controlling viscosity.

Magnetorheological (MR) dampers are semi-active devices that contain magneto- rheological fluids. Activation of the damper's built-in magnetic field causes a fast and dramatic change in the apparent viscosity of MR fluid contained in the damper. The fluid changes state from liquid to semi-solid in milliseconds. The result is an infinitely variable, controllable damper capable of large damping forces. MR dampers offer an attractive solution to energy absorption in mechanical systems and structures. This is because they can be battery operated, require minimal power for operation, and have a broad range of capabilities; for example, the absence of mechanical valving (for flow control) in the damper, high and low temperature tolerances, insensitivity to impurities penetration, fluid stability, and long operational life. Most importantly, they are inexpensive devices to manufacture, utilize and maintain. A controllable damper is described in U.S. Pat. No. 6,019,201.

All publications referred to herein are incorporated by reference to the extent not inconsistent herewith.

SUMMARY OF THE INVENTION

Magnetorheological materials are typically comprised of magnetizable particles suspended in a carrier material. A magnetorheological material exhibits rapid and reversible changes that are controllable by an applied magnetic field. The shear stress and viscosity of such a material is related to whether the material is in the presence of a magnetic field, termed the on-state, or the absence of a magnetic field, termed the off-state. In the on-state, the magnetic particles align with the magnetic field and increase the shear yield stress and viscosity of the material over its off-state value.

Stable polymeric magnetorheological (MR) gels have been developed with higher off-state viscosities than silicone oils, resulting in higher coefficients of damping and better fatigue resistance. MR gels with off-state viscosities between about 20 cp and about 200 cp lower than currently commercial available fluids are also provided herein.

The magnetorheological material provided herein comprises magnetic particles and a carrier material which is a polymeric gel, preferably a partially-crosslinked polymeric gel. Preferred MR gels of this invention are made by a method comprising forming said polymeric gel in the presence of said magnetic particles. Partial crosslinking is achieved by controlling reaction conditions such as time, temperature, catalysts, etc. as known to the art, and in two-component polymer systems is controlled by reacting the components in non-stoichiometric amounts. The term "partially crosslinked" means the gel contains a measurable amount of crosslinking but measurably less than all crosslinking possible. In this invention the crosslinking is covalently bonded. For partially crosslinked polymeric gels of this invention, nonstoichiometry of the components leads to the desired degree of crosslinking.

Both thermosetting and thermoplastic polymers are useful in this invention.

Magnetorheological materials are also provided having a selected off-state viscosity, and comprising magnetic particles and a carrier material which is a polymeric gel. There may or may not be a diluent or non-gel carrier fluid present. Viscosity of the fluid may be controlled by degree of crosslinking of the polymer, amount of plasticizer (also referred to herein as a diluent), and amount and type of magnetic particles. As is known to the art, plasticizers compatible with the polymer system being used should be selected.

The magnetic particles can be any magnetic particles known to the art. The particle component of the magnetorheological material of the invention can consist essentially of any solid which is known to exhibit magnetorheological activity, e.g., made of compounds which exhibit paramagnetic, superparamagnetic or ferromagnetic activity. Such particles may be made of iron, iron oxide, iron nitride, iron carbide, carbonyl iron, chromium dioxide, low carbon steel, silicon steel, nickel, cobalt, and mixtures thereof. Iron oxide includes all known pure iron oxides, such as ferric and ferrous oxides, e.g., ferrites and magnetites. The magnetic particles can be comprised of alloys of iron, such as those containing aluminum, silicon, cobalt, nickel, vanadium, molybdenum, chromium, tungsten, manganese and/or copper. Typically, the magnetic particles are in the form of metal powders prepared by processes well known to those skilled in the art. Typical methods for the preparation of metal powders include the reduction of metal oxides, grinding or attrition, electrolytic deposition, metal carbonyl decomposition, rapid solidification, or smelt processing. Various metal powders that are commercially available include iron powders, reduced iron powders, insulated reduced iron powders, and cobalt powders. Preferred particles of the present invention are iron powders, reduced iron powders, iron oxide powder/iron powder mixtures and iron oxide powder/reduced iron powder mixtures. Most preferred are reduced carbonyl iron particles. Magnetic particles with high saturation magnetization, such as iron/cobalt alloys are preferable for this application. These iron alloys are selected to provide high yield stress.

The particle size has a great influence on the rheology of the on and off states of the fluid. For larger particles (5–7

μm) the yield stress is greater than for smaller particles (~2 μm). Particles larger than 10 um have increased settling and thus form less stable MRF. Magnetic particles may be present at between about 10 to about 95% by weight of the material. The amount of magnetic particles should be sufficient to provide the required apparent on-state shear yield stress and viscosity, preferably 5 to 50 volume percent, more preferably 15 to 40 volume percent, based on the total volume of the magnetorheological material. The magnetic particle component preferably has an average particle size ranging from about 5 nm to about 10 μm or about 100 nm up to about 10 μm, or about 1 μm to about 10 μm. Preferably, the average particle diameter of the particles is at least about 0.03 micrometers, more preferably at least about 0.05 micrometers. Preferably, the magnetic particles are present at a mass fraction of around 80% (or about 50 percent by volume) when high yield stresses are desired.

The remainder of the material, e.g., about 20 to about 99 mass percent, comprises a carrier component. A volume fraction of about 50 to about 95 volume percent, preferably about 60 to about 85 volume percent based on the total volume of the magnetorheological material, is also useful. The carrier component preferably comprises or consists essentially of a covalently crosslinked polymeric gel component capable of providing the desired shear yield stress and viscosity, preferably a thermosetting or thermoplastic polymer, polyurethane, modified polyurethane (including those using reactions with isocyanate, isocyanurate, urea, allophanate, biuret, oxazolidone, carbodiimide or cyclic imide), and silicone, epoxy, acrylic, polyamide, polycarbonate, polyester, polyanhydride, and polyimide polymers. The polymeric may be made using a polymer as described in U.S. Pat. No. 5,645,752, incorporated herein by reference.

Additionally, non-polymeric materials may be added to the material to adjust viscosity, preferably a natural fatty oil, mineral oil, polyphenylether, dibasic acid ester, neopentylpolyol ester, phosphate ester, polyester, cycloparaffin oil, paraffin oil, unsaturated hydrocarbon oil, synthetic hydrocarbon oil, perfluorinated polyether or halogenated hydrocarbon. Other optional additives include thixotropic agents, rust inhibitors, carboxylate soaps, antioxidants, lubricants, and viscosity modifiers, all known to the art.

The magnetorheological material is preferably in the form of a continuous gel phase, in which all the polymer is covalently crosslinked to form a network rather than being made up of gel-coated particles in a liquid carrier. Magnetorheological materials of this invention may be made by forming the polymeric gel in the presence of the magnetic particles to provide improved dispersion stability, especially when the gel coats the particles in the form of monolayers (e.g., self-assembled monolayers [SAMs]), bilayers, multiple layers, or thin films. A diluent may be added to the magnetic particles and the polymeric gel precursor prior to polymerization. Magnetorheological materials of this invention may also be formed by adding the magnetic particles after the polymerization reaction has occurred. Or, the polymerization reaction may be conducted, diluent added, and then the magnetic particles added. In any event, the magnetorheological material is preferably in the form of a continuous gel phase, rather than being made up of gel-coated particles in a liquid carrier. In one embodiment, the polymeric gel is substantially uniformly distributed throughout said material.

The reaction conditions for making the polymer gels, especially the ratios of the reactants, are adjusted to vary the amount of cross-linking and gel formation. For a given polymer, the greater the amount of cross-linking and gel formation the greater the viscosity and the less the magnetic particle settling.

For a given polymeric gel system, the reaction chemistry typically involves one or more monomer reactant(s) and a plasticizer. Sample reaction chemistries for different polymer systems are given below.

For a polyurethane system appropriate reactants include polyether-polyols or polyester-polyols and aromatic or cycloaliphatic isocyanate. An appropriate plasticizer for the reactants is an aromatic-ester. Other plasticizers known to the art may also be used.

For a silicone system, appropriate reactants include vinyl terminated silicone polymers and silane groups. An appropriate plasticizer for these reactants is a silicone oil. Other plasticizers known to the art may also be used.

For an epoxy system, appropriate reactants include diglycidal ether of bis-phenol A (DGEBA) or Novalak resins and aromatic, cycloaliphatic or aliphatic amines or Lewis base catalysts. An appropriate plasticizer for this system is diglycidal ether of butane diol (DGEB). Other plasticizers known to the art may also be used.

The desired viscosity of the magnetorheological material in the off-state to be selected depends upon the proposed application. For some applications, minimizing the off-state viscosity is important. For applications requiring high damping forces, the ability to increase the off-state viscosity can be extremely valuable. The selected off-state viscosity can be between about 20 and about 5,000,000 cp.

The magnetorheological materials of this invention have very low settling rates of particles and preferably possess ideal initial (off-state) viscosities for selected applications, such as land-based applications, aerospace applications, and earthquake control. For dampers, low to medium viscosities are required, e.g. about 20 to about 10,000 cp. For clutches, low viscosities, e.g. about 20 to about 200 cp viscosities are required.

MRF additives are necessary to prevent agglomeration and settling. As the particles settle and the distance between them decreases, the small level of remnant magnetization could play a role in agglomeration. Some of the materials used as additives are nanostructured silica, fibrous carbon, and various polymers. Nanoscale silica forms a coating on magnetic particles as a thixotropic network. [Phule, Pradeep P. "Synthesis of Novel Magnetorheological Fluids" *MRS Bulletin,* 23–25, August 1998.]

The present invention provides a method for making a magnetorheological material having a selected off-state shear yield stress and viscosity comprising mixing a polymeric gel carrier material with a selected quantity of magnetic particles or polymerizing the carrier in the presence of magnetic materials. The carrier material and quantity of magnetic particles are selected together so that the resulting magnetorheological material has the desired off-state shear yield stress and viscosity. The desired off-state shear yield stress and viscosity is selected by determining the required off-state output characteristics of a magnetorheological device that employs the magnetorheological material to effect a damping force, torque or resulting pressures. The magnetorheological material composition having the desired viscosity may be selected by preparing such materials in accordance with the teachings herein to provide selected viscosities, testing the viscosities of known magnetorheological material compositions, or by other means known to the art. For example, polymer selection, degree of polymerization, reactant stoichiometry (e.g., polyols and isocyanates for polyurethane systems, vinyl-terminated silicone polymers and silane groups for silicone systems, and ethers, resins, amines and catalysts for epoxy systems) as well as addition of reactive or non-reactive plasticizers, percent and type of particulate material, cure time and temperature, as known to the art, can be varied to achieve the desired off-state viscosities.

By selection of the appropriate polymer system with the desired off-state viscosity, material strength and fatigue life is improved.

The present invention also provides a method of controlling the output characteristics of a magnetorheological device containing a magnetorheological material of the present invention, comprising selecting a magnetorheological material of the desired off-state viscosity and dependence of apparent viscosity on magnetic field and controlling the magnetic field to change the apparent viscosity of said material. The desired off-state viscosity and range of on-state apparent viscosities are selected by determining the required off-state and on-state output characteristics of the magnetorheological device employing the magnetorheological material. The off-state shear yield stress and viscosity of the magnetorheological material and the dependence of the apparent viscosity on the magnetic field can both be selected by selecting the appropriate magnetorheological material composition as described above. The material behaves in a Newtonian manner in the off-state. For dampers and clutches the on-state yield stresses should be as high as possible. As is known to the art, shear stress equals yield stress plus shear rate times plastic viscosity.

Such methods for controlling output characteristics of a magnetorheological device having a selected magnetic field in its on-state, containing a magnetorheological material comprise: selecting a desired off-state viscosity for said magnetorheological fluid; selecting a desired on-state apparent viscosity for said magnetorheological fluid; and providing in said device a magnetorheological material having said selected off-state viscosity and said on-state apparent viscosity in said magnetic field.

The present invention provides a method for making a magnetorheological material comprising selecting a desired off-state viscosity for said material; selecting a desired off-state shear yield stress; selecting a quantity of magnetic particles; providing an amount of a polymeric gel carrier or precursor thereof calculated to produce said desired off-state viscosity when formulated with said quantity of magnetic particles; and formulating said material by combining said carrier or precursor with said magnetic particles. The term polymeric gel carrier precursor refers to monomers used to form a polymeric gel prior to crosslinking.

Magnetorheological fluids comprising magnetic particles coated with monolayers, self-assembling monolayers, bilayers or multiple layers of polymeric gel are also provided herein. Self-assembled monolayers are desirable for good particle dispersion and because they take up minimum possible volume, higher mass content of magnetic particles is achievable. They are typically prepared from alkanethiols as is known to the art. Bilayers may also be prepared by means known to the art using surfactant bilayers and provide stable dispersions. Multilayers or thin films can be made using fluidized bed coatings. The carrier phase may be liquid, a continuous gel phase, or a continuous crosslinked polymeric gel phase.

DETAILED DESCRIPTION OF THE INVENTION

Figure 1:
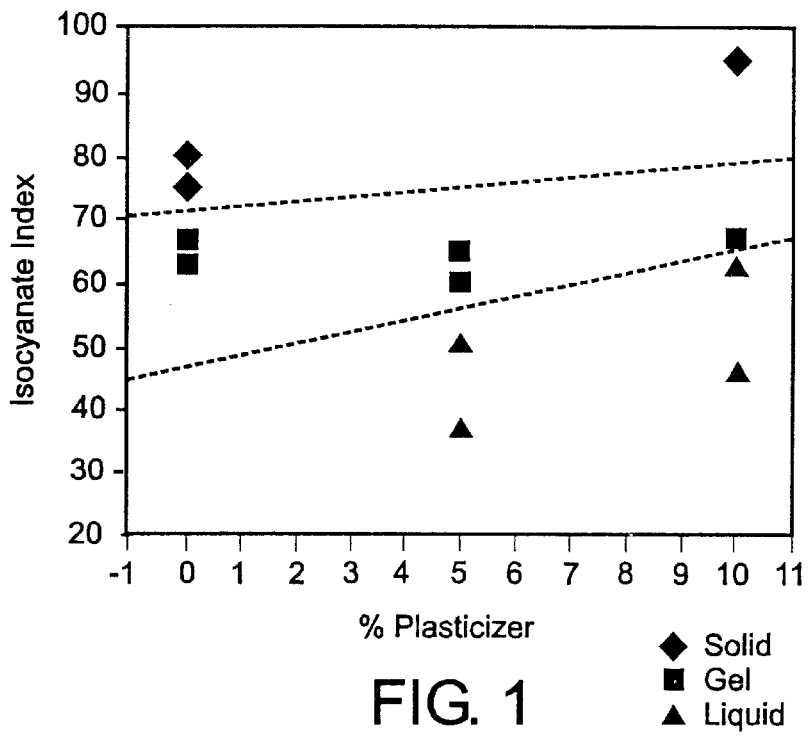
FIG. 1 is a phase diagram of a polyurethane polymer (PEG 600) gel system.
Figure 2:
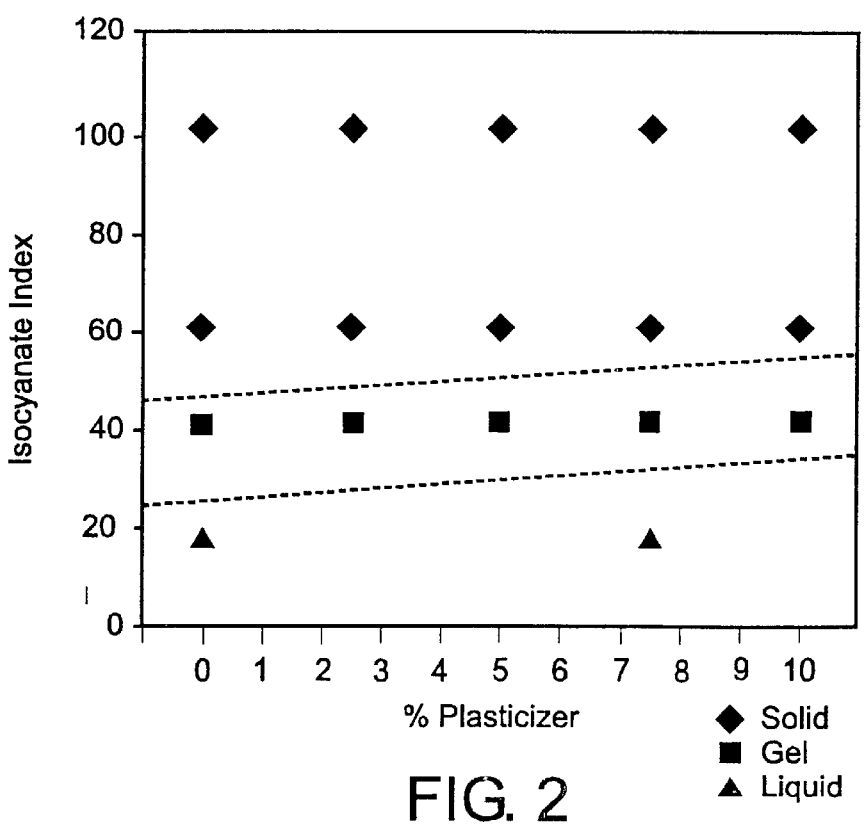
FIG. 2 is a phase diagram of a polyurethane system polymer (Voranol 360) gel system.

Polymer gels used in this investigation include polyurethanes, epoxies, and silicones. The rheology of each system has been shown to be controllable. Rheological properties are investigated with and without magnetic field. The MRPGs of this invention have several advantages over present commercial fluids. Because they can be developed at different levels of "off-state" properties through formulation of resin and crosslinkers, their viscosities are custom-suited to a particular device and, in the case of dampers, a fail-safe characteristic is possible. A fail-safe MR device is defined as a device which retains a reasonable force/torque capacity in the event of a power supply or electronic system failure. Additionally, since polymer crosslinking also takes place on magnetic particle surfaces by reactions taking place in the presence of the particles, settling of the magnetic particles is reduced. In addition, through suitable control of the carrier fluid viscosity, high yield stresses are achieved.

Rotational viscometry is used to assess the Theological properties of the materials developed. The rheology studies include: a) viscosity vs. shear rate, and b) shear stress vs. temperature.

EXAMPLES

Three different matrix materials are preferred for forming the polymeric gel-containing MRPGs of this invention: a polyurethane system, an epoxy system, and a silicone system.

Polyurethane System

Polyurethanes are prepared from reactions between polyglycols and isocyanates. The polyglycols are linear polymers of alkylene oxides. These reactions can produce straight, branched or cross-linked products. Other groups included in polyurethanes can be aromatics, amides, esters and ethers groups. Preferred polyols in these applications are linear chained polymers of alkylene oxides with molecular weights ranging from 200 to 1000. Reaction of isocyanates with polyols results in formation of the carbamate group. The type of isocyanate most commonly used is polymethylene polyphenyl diisocyanate (PMDI). Based on the amount and functionality of isocyanate in the reaction, the molecules can become branched or cross-linked. The isocyanate index describes the mole equivalent amount of isocyanate in the polyurethane. The higher the index the more likely the polymer will cross-link and branch. As the cross-linking increases the polyurethane becomes harder and more viscous. Another component that can be added to the system is a plasticizer, which may be a reactive or non-reactive material. This component acts to solvate the reacted polyurethane.

Using polyol and isocyanate, systems are designed to behave as materials exhibiting a wide range of rheological behavior. The consistency of these materials can range from a viscous liquid to a solid-like gel to a hard solid. The rheological behavior of the resulting materials is determined by isocyanate index and percent plasticizer. It was observed that typical viscous liquids have isocyanate indices of less than about 45. The gels' indices range from 50–70 and the solids typically had indices above 70. The plasticizer had its greatest effect at an isocyanate index of ~60 where increasing the percent plasticizer from 5% (the material was a gel) to 10% (the material was a viscous liquid) resulted in substantial changes in fluid rheology. The viscosity of these materials can range from 100 cp to $1 \times 10^8$ cp.

One polyglycol used is polyethylene glycol, which has an average molecular weight of 600 and a functionality of 2.0 (Polyglycol E-600, Dow Chemical). The isocyanate used is polymethylene polyphenyl isocyanate (p-MDI, Dow PAPI 27) which has a functionality of 2.7 and the equivalent weight is 134. A non-reactive plasticizer is also used in these polyurethanes. The plasticizer is propanol, oxybis-, dibenzoate (Benzoflex, Velsicol Chemical Corporation). A second polyurethane system is based on a polyether polyol (Voranol 360, Dow Chemical) with equivalent weight of 360 and functionality of 4.5. This polyol is also reacted with p-MDI and the non-reactive plasticizer is also added.

Polyol Polyglycol 600 (Dow Chemical), isocyanate PAPI 27 (Dow Chemical), and plasticizer Benzoflex (Velsicol Inc.) were all placed in a preheated vacuum oven. The materials were held for 24 hours at 100° C. and a vacuum of −60 kPa, then cooled to room temperature.

The materials were weighed, then the Benzoflex was added to the polyol and mixed with a glass rod. The iron particles were added either at this stage or after demolding. The isocyanate was then added to the mixture and stirred in with a glass rod.

The mixture was heated to 100° C. and demolded after about 12 hours. If the iron particles were not already added during mixing of the reactants, they were added and mixed into the polymeric gel.

One magnetorheological polyurethane gel prepared using this method with a mass loading of 50% (w/w) iron particles had an off-state viscosity of approximately 0.78 Pascal seconds at 70° C. and a shear strain rate of 40 1/s. The off-state viscosity of this material depended less on the shear rate than that of a conventional magnetorheological fluid (LORD MRF-132) for shear rates between 40 1/s and 150 1/s. The viscosity of this material was also higher than that of the conventional material, whose viscosity was less than 0.1 Pascal seconds.

Other magnetorheological polyurethane gels prepared using this method have had viscosities ranging from 0.1 to 1000 Pascal seconds.

Figure 3:
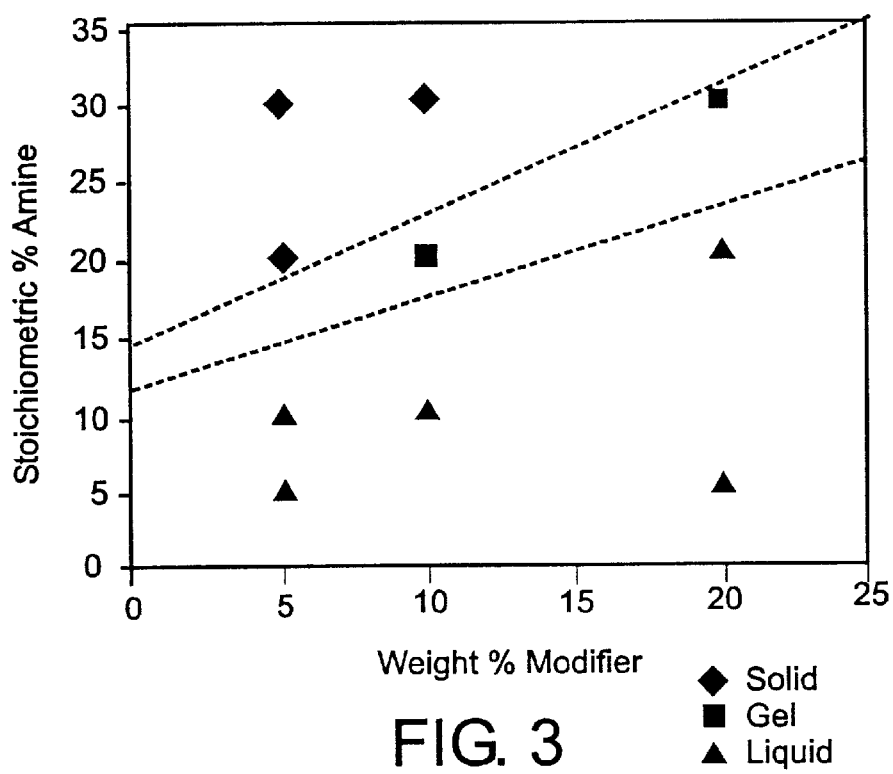
FIG. 3 is a phase diagram of an epoxy polymer (bispehnol A resin and cycloaliphatic amine) gel system.
Figure 4:
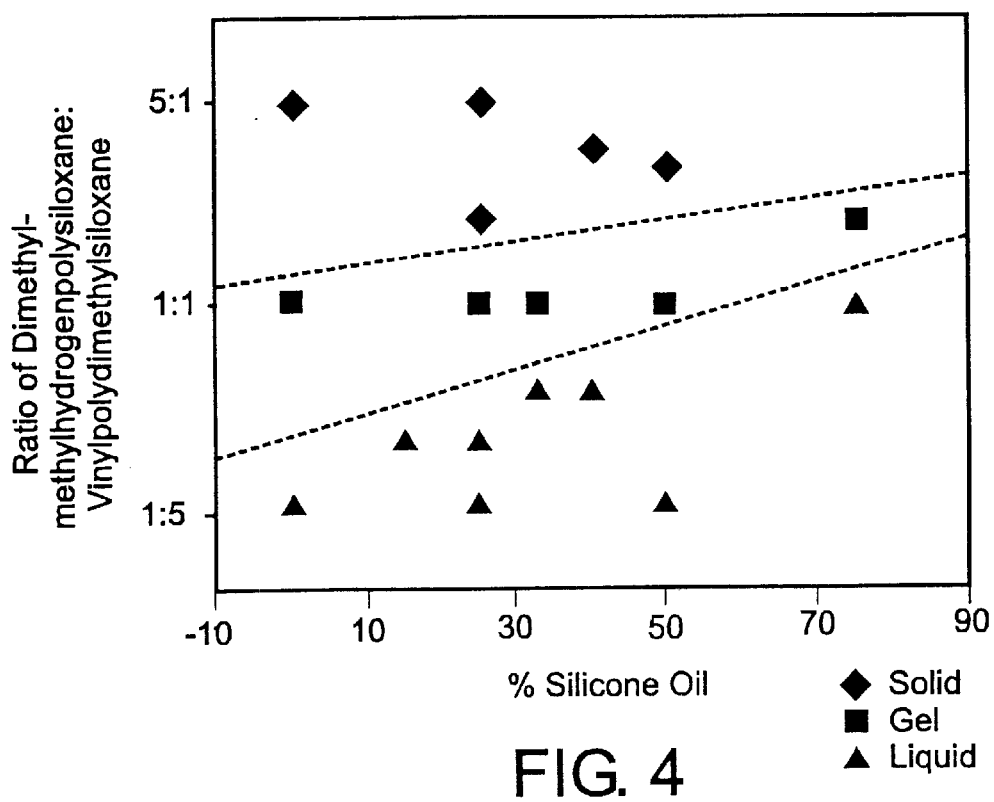
FIG. 4 is a phase diagram of a silicon polymer gel system.

By controlling the composition of the polyurethane using the three components described above, the polyurethanes vary from a viscous liquid to a solid-like gel to an elastic solid. As the polyol and isocyanate react polymer crosslinking takes place. For a larger isocyanate index (the isocyanate index (II) is the molar ratio of isocyanate to polyol), a greater degree of crosslinking occurs. With this increase, the polyurethane becomes more viscous. In the case of the PEG-600 system, an index less than 45 typically results in a liquid. For an index greater than 70, the material is solid. Gels form between these indices as shown in FIG. 3. At higher concentrations of plasticizer the materials remain liquid at higher isocyanate indices [Blattman, Dan, Gustav Hamann, and Alan Fuchs "Development of Polyurethane Elastomers and Gels" Presented at AIChE Annual Conference, November 1999]. FIG. 4 shows the phase diagram for the Voranol 360 system which is another polyurethane system. In this system, without plasticizer, the gel region is at an isocyanate index (II) of ~40, with liquids below an isocyanate index (II) of ~20.

Silicone Polymers

Figure 6:
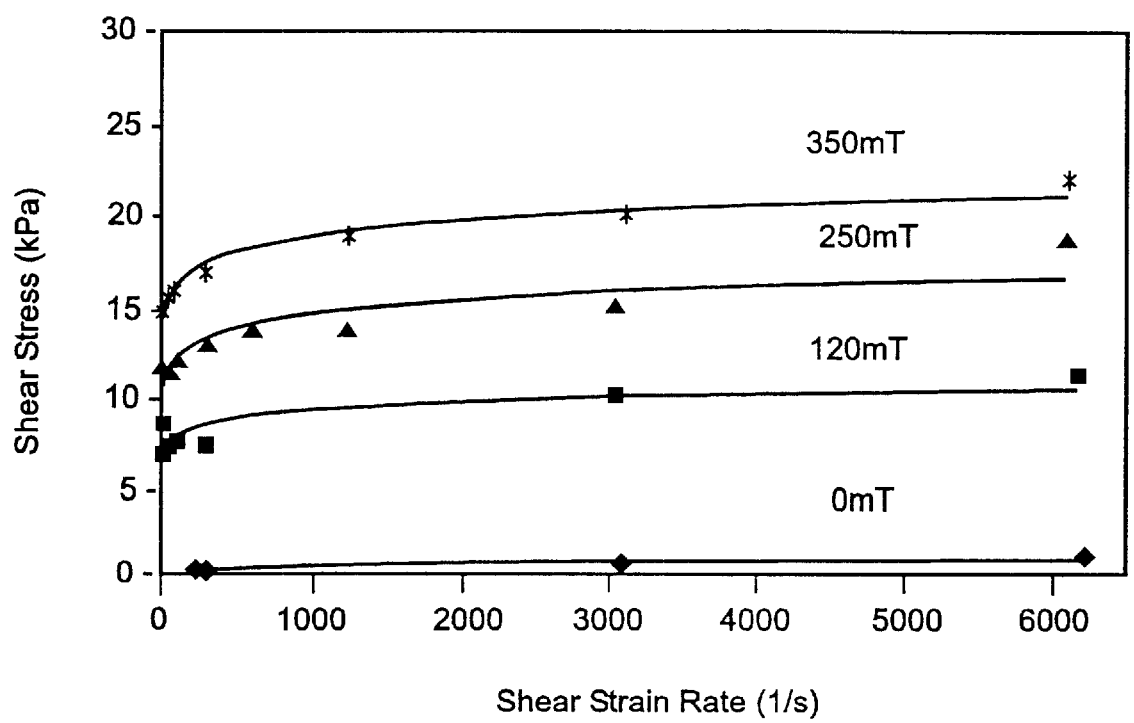
FIG. 6 is a graph showing extrapolated shear stress at zero shear strain at different on-state currents (tesla).

A silicone polymer is composed of a resin and a crosslinker and diluted by silicone oil. Polymer gels are formed by altering the ratio of the resin to the crosslinker and the percentage of silicone oil. As can be seen by FIG. 6, at low silicone oil levels, a large ratio of crosslinker to resin (greater than 1:1) will produce a rubbery solid, while a low ratio of crosslinker to resin (less than 1:5) will produce a viscous liquid. At high content of silicone oil, for example greater than 70%, the material remains a viscous liquid up to nearly 1:1 ratio and forms a gel at higher ratios.

Silicone elastomers are available either in the form of condensation type or addition type of systems. For the proposed application, addition polymers are preferred because there are no condensation products. These systems involve the reaction of vinyl-terminated silicone polymers which are cross-linked with silane groups which are activated with a platinum salt catalyst. Silicone oils are used to plasticize the reacted silicone network formed.

A preferred silicone polymer system includes vinylpolydimethylsiloxane (VPDMS) resin (GE Silicones RTV6136A polymer gel) which is difunctional with a molecular weight of ~10,400, dimethyl methylhydrogenpolysiloxane (DMMHPS), a crosslinker which has a molecular weight of ~10,400 (GE Silicones RTV6136B polymer gel), and a low viscosity (5 cP) silicone oil, (GE Silicones SF96-5) is used for viscosity control. Aluminum stearate (Spectrum Co.) is added as a surfactant. Fumed Silica (Cabosil T-720, Cabot Corp.) is added as a thixotrope.

Epoxy Polymers

Epoxy polymers are also useful as polymeric gels. Thermoset epoxies are available in many families of epoxides and curing agents. The general family of reactions involves the epoxide group and aromatic or aliphatic amines. Catalytic systems are available as well. Many epoxy plasticizers are available including low molecular weight hydrocarbons. Preferably, diglycidal ether of Bisphenol-A is used as the resin (Epon 828, Shell Chemicals). It has an equivalent weight of 185–192 and a functionality of 2.0. The Bisphenol-A is cured with a cycloaliphatic amine (Epi-cure 3370, Shell Chemicals). It has an equivalent weight of 73 and a functionality of 2.0. A reactive modifier, cresyl glycidyl ether (Heloxy Modifier 62, Shell) has an equivalent weight of 175–195 and a functionality of 1.0.

Figure 5:
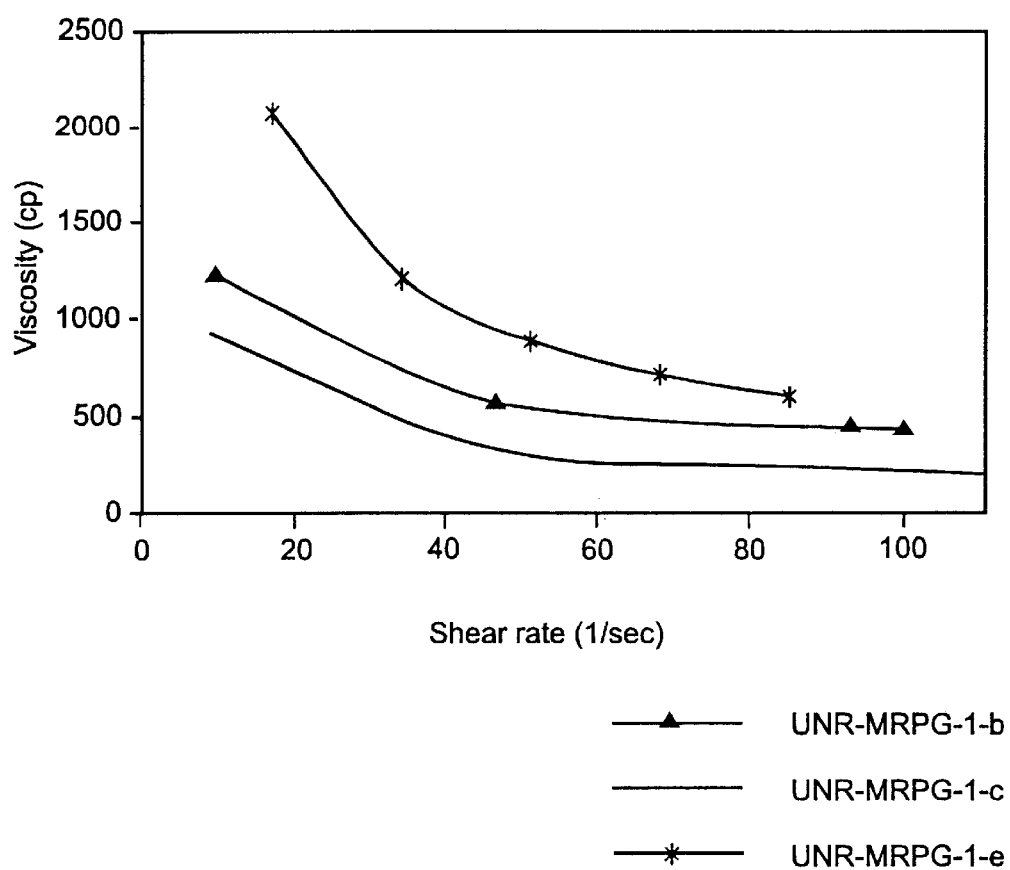
FIG. 5 is a graph of viscosities and shear rates of polymer gel carriers of this invention.

FIG. 5 shows the phase diagrams for the epoxies. For low weight percent modifier, for example at 5% modifier, the liquid region occurs below 10% amine content, while the solid forms at an amine content of 20% of stoichiometric or higher. At higher modifier content, for example 20% modifier, polymeric gels form above 25% amine content.

Carbonyl iron is preferably added to provide the magnetic properties of the fluid. The preferred carbonyl iron (ISP Corp.) grades used are S-3700 (1–3 μm) and S-1651 (3–6 μm).

Typical MRPG formulations contain the following compositions: 5–30% silicon oil (0.5–50 cp), 0.5–5% VPDMS, 0.1–2% DMMHPS, aluminum stearate or fumed silica, iron particles ISP-S1651 or QMP atomet 95G—70–85%.

Table 1 shows the formulations of several MRPGs of this invention.

Viscometry

A Brookfield viscometer is preferably used for viscosity measurements. Model # DV-III, Shear rates of 0–200 sec$^{-1}$.

Also, a piston driven flow type rheometer was used to measure the shear stress and its variation due to different applied magnetic field and various shear strain rates. This instrument is capable of measuring shear rates from 20–20,000 sec$^{-1}$.

The off-state viscosity can be controlled by the degree of crosslinking and the amount of diluent, non-reactive plasticizer, or modifier added to the system.

Figure 7:
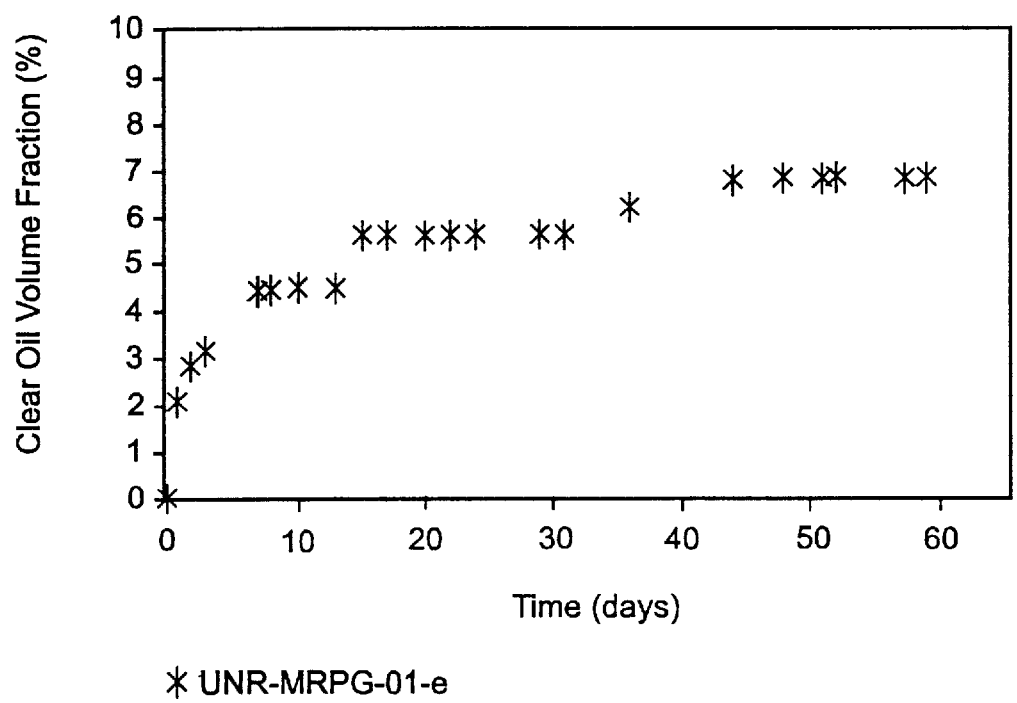
FIG. 7 is a graph showing settling over time of a polymer gel carrier of this invention.

Three MRPGs were investigated using rotational viscometry and designated as UNR-MRPG -b 1b, 1-c and 1-e (see Table 1). The results are shown in FIG. 7. This data indicates that materials with a wide range of viscosities can be produced. In this case, UNR-MRPG 1-b has a viscosity very similar to commercially available MRF. UNR-MRPG 1-c has a viscosity lower than commercially available MRF and UNR-MRPG 1-e has a viscosity higher than commercially available MRF.

Shear Stress/Strain Testing

The shear stress of UNR-MRPG 1-c is obtained for various shear strain rates and applied magnetic fields. The results of these data are presented in FIG. 6. The yield stress is obtained by extrapolation of the shear stress data back to a shear strain rate of zero. The yield stress for this MRPG is therefore 17 kPa at 350mT of input current. This is very close to the yield stress for commercially available MRF.

Stability Testing

Iron particle settling measurements are done by measuring the rate of formation of a clear fluid layer on the top of a stagnant fluid. This is measured as the volume fraction of clear fluid as the iron particles settle into the carrier fluid. The rate of change of volume fraction free of iron particles is measured as a function of time. FIG. 7 is the settling data of UNR-MRPG. The settling rate of UNR-MRPG-01-e is comparable to or better than

TABLE 1

MRPG Formulations.

| | |
|---|---|
| 1)UNR-MRPG-01-a | 9.6% wt. silicone oil (5 cp viscosity), 8.0% wt. VPDMS, 1.6% wt. DMMHPS, 3.8% wt. aluminum stearate, iron particles ISP-S1651-76.9% wt. |
| 2)UNR-MRPG-01-b | 15.4% wt. silicone oil (5 cp viscosity), 3.2% wt. VPDMS, 0.7% wt. DMMHPS, 3.8% wt. aluminum stearate, iron particles ISP-S1651-76.9% wt. |
| 3)UNR-MRPG-01-c | 18.0% wt. silicone oil (5 cp viscosity), 1.7% wt. VPDMS, 0.3% wt. DMMHPS, 0.4% wt. fumed silica, iron particles ISP-S1651-79.5% wt. |
| 4)UNR-MRPG-01-c-2 | 18.0% wt. silicone oil (50 cp viscosity), 1.7% wt. VPDMS, 0.3% wt. DMMHPS, 0.4% wt. fumed silica, iron particles ISP-S1651-79.5% wt. |
| 5)UNR-MRPG-01-d | 17.3% wt. silicone oil (5 cp viscosity), 1.7% wt. VPDMS, 0.2% wt. DMMHPS, 3.8% wt. aluminum stearate, iron particles ISP-S1651-76.9% wt. |
| 6)UNR-MRPG-01-e | 19.0% wt. silicone oil (5 cp viscosity), 0.83% wt. VPDMS, 0.17% wt. DMMHPS, 1.0% wt. fumed silica, iron particles ISP-S1651-79.0% wt. |
| 7)UNR-MRPG-01-e-2 | 19.0% wt. silicone oil (5 cp viscosity), 0.83% wt. VPDMS, 0.17% wt. DMMHPS, 1.0% wt. fumed silica, iron particles ISP-S1651-79.0% wt. (50% wt. QMP-Atomet 95G and 50% wt. ISP-S1651). |

Polymerization in the Presence of Magnetic Particles

Two samples were prepared. For the first, silicone oil, both polymer components, colloidal silica and iron particles were mixed together, the polymerization reaction was allowed to occur, and the properties of the material were measured. For the second, the silicone oil and polymer components were mixed and allowed to react for 24 hours. Colloidal silica and iron particles were then added. These materials were tested and compared. At low shear rates the first sample had higher viscosity, indicating that polymer gel had deposited on the particle surface and was present in the carrier fluid. The first sample also showed improved stability with respect to settling, as shown in Table 3.

TABLE 3

| | Clear oil layer (vol %) | |
|---|---|---|
| Days | Sample 1 | Sample 2 |
| 0 | 0 | 0 |
| 1 | 2.9 | 11.5 |
| 2 | 9.5 | 18.3 |
| 6 | — | — |
| 8 | 15.2 | — |

Magnetorheological polymeric gel (MRPG) systems have been developed which are superior to commercially available MRF's. This approach has been demonstrated for three different families of polymeric gels: polyurethanes, epoxies and silicones. Testing of this family of materials indicates that stable MR fluids can be achieved and polymeric MR fluids with consistencies varying from a viscous liquid to solid-like gels can be formulated. These novel materials offer advantages in the areas of fluid stability, reduced degradation, increased material strength and improved fatigue resistance. The results indicate that materials with superior viscosity and yield stress control, high yield stress and reduced settling have been developed.

While particular embodiments of the present invention have been described, it is to be understood that various changes, modifications and additions may be made within the scope of the present invention set forth in the following claims.

What is claimed is:

1. A magnetorheological material comprising magnetic particles and a carrier material comprising a partially covalently-crosslinked polymeric gel wherein said carrier material is made by a process comprising providing nonstoichiometric amounts of monomers to a polymerization reaction forming said gel.

2. The material of claim 1 made by a method comprising forming said polymeric gel in the presence of said magnetic particles.

3. The material of claim 1 made by a method comprising forming said polymeric gel prior to adding said magnetic particles.

4. The material of claim 3 made by a method comprising polymerizing said polymeric gel in the presence of a plasticizer, then adding said magnetic particles.

5. The material of claim 3 made by a method comprising forming said polymeric gel, adding a diluent thereto, and adding iron particles thereto.

6. The material of claim 1 wherein said magnetic particles are ferromagnetic particles.

7. The material of claim 1 comprising a plasticizer.

8. The material of claim 1 wherein said polymeric gel is a polyurethane polymeric gel.

9. The material of claim 1 wherein said polymeric gel is a silicone polymeric gel.

10. The material of claim 1 wherein said polymeric gel is made using a thermosetting polymer.

11. The material of claim 1 wherein said polymeric gel is made using a thermoplastic polymer.

12. The material of claim 1 wherein said polymeric gel is substantially uniformly distributed throughout said material.

13. A magnetorheological material comprising magnetic particles and a carrier material comprising a completely or partially covalently-crosslinked polymeric gel wherein said polymeric gel is a modified polyurethane gel polymerized using a monomer selected from the group consisting of isocyanurate, urea, allophanate, biuret, oxazolidone, carbodiimide and cyclic imide.

14. A magnetorheological material comprising magnetic particles and a carrier material comprising a completely or partially covalently-crosslinked polymeric gel wherein said polymeric gel is an epoxy polymeric gel.

15. A magnetorheological material having a selected off-state viscosity comprising magnetic particles and a carrier material, said carrier material comprising a partially covalently-crosslinked polymeric gel wherein said carrier material is made by a process comprising providing nonstoichiometric amounts of monomers to a polymerization reaction forming said gel.

16. The magnetorheological material of claim 15 wherein said selected off-state viscosity is between about 20 and about 5,000,000 cp.

17. The material of claim 15 wherein said polymeric gel is a polyurethane polymeric gel.

18. The material of claim 15 wherein said polymeric gel is a silicone polymeric gel.

19. The material of claim 15 wherein said polymeric gel is substantially uniformly distributed throughout said material.

20. A magnetorheological material having a selected off-state viscosity comprising magnetic particles and a carrier material, said carrier material comprising a polymeric gel wherein said polymeric gel is an epoxy polymeric gel.

21. A method for making a magnetorheological material comprising:
   a) selecting a desired off-state viscosity for said material;
   b) selecting a desired on-state shear yield stress;
   c) selecting a quantity of magnetic particles;
   (d) providing an amount of a partially covalently-crosslinked polymeric gel carrier or precursor thereof calculated to produce said desired off-state viscosity when formulated with said quantity of magnetic particles wherein said carrier is made by a process comprising providing nonstoichiometric amounts of monomers to a polymerization reaction forming said gel;
   e) formulating said material by combining said carrier or precursor with said magnetic particles.

22. The method of claim 21 wherein said formulation step includes adding said magnetic particles to a polymeric gel precursor and polymerizing said precursor to form said polymeric gel.

23. The method of claim 21 comprising adding said magnetic particles to said polymeric gel carrier after polymerization thereof.

24. The method of claim 22 wherein a diluent is added to said magnetic particles and said polymeric gel precursor prior to polymerization.

25. The method of claim 23 wherein a diluent is added after polymerization.

26. The method of claim 24 wherein said polymeric gel is a polyurethane polymeric gel.

27. The method of claim 21 wherein said polymeric gel is a silicone polymeric gel.

28. The material of claim 21 wherein said polymeric gel is substantially uniformly distributed throughout said material.

29. A method for making a magnetorheological material comprising:
   a) selecting a desired off-state viscosity for said material;
   b) selecting a desired on-state shear yield stress;
   c) selecting a quantity of magnetic particles;
   d) providing an amount of a polymeric gel carrier or precursor thereof calculated to produce said desired off-state viscosity when formulated with said quantity of magnetic particles wherein said polymeric gel is an epoxy polymeric gel;
   e) formulating said material by combining said carrier or precursor with said magnetic particle.

30. A method for controlling output characteristics of a magnetorheological device using a magnetic field in its on-state, containing a magnetorheological material comprising:
   (a) selecting a desired off-state viscosity for said magnetorheological material;
   (b) selecting a desired on-state apparent viscosity for said magnetorheological material;
   (c) providing in said device a magnetorheological material having said selected off-state viscosity and said on-state apparent viscosity in said magnetic field;
wherein the magnetorheological material comprises magnetic particles and a carrier material comprising a partially covalently-crosslinked polymeric gel wherein said carrier material is made by a process comprising providing nonstoichiometric amounts of monomers to a polymerization reaction forming said gel.

31. A magnetorheological fluid comprising magnetic particles coated with a monolayer and a carrier material comprising a polymeric gel.

32. The magnetorheological fluid of claim 31 wherein said monolayer is self-assembling.

33. The magnetorheological fluid of claim 32 wherein the monolayer is prepared using an alkanethiol.

34. A magnetorheological fluid comprising magnetic particles coated with a bilayer and a carrier material comprising a polymeric gel.

35. The magnetorheological fluid of claim 34 wherein the bilayer is a surfactant bilayer.

36. A magnetorheological fluid comprising magnetic particles coated with multiple layers of a polymeric gel.

* * * * *

UNITED STATES PATENT AND TRADEMARK OFFICE
CERTIFICATE OF CORRECTION

PATENT NO. : 6,527,972 B1
DATED : March 4, 2003
INVENTOR(S) : Fuchs et al.

It is certified that error appears in the above-identified patent and that said Letters Patent is hereby corrected as shown below:

Column 3,
Line 26, please replace "um" with -- $\mu$m --.

Column 4,
Line 26, please replace "Gordaninej ad" with -- Gordaninejad--.

Column 7,
Line 2, please replace "um" with -- $\mu$m --.
Line 35, after "polymeric" please insert -- gel --.

Column 10,
Line 64, please replace "Theological" with -- rheological --.

Column 11,
Line 32, please replace "Theological" with -- rheological --.

Column 14,
Line 14, please replace "-b 1b" with -- 1-b --.
Line 40, after "than", please insert -- commercial MRF. --.

Column 17,
Line 6, please replace "24" with -- 21 --.
Line 26, please replace "particle" with -- particles --.

Signed and Sealed this

Tenth Day of June, 2003

JAMES E. ROGAN
*Director of the United States Patent and Trademark Office*